US011718353B2

(12) United States Patent
Brooks et al.

(10) Patent No.: US 11,718,353 B2
(45) Date of Patent: Aug. 8, 2023

(54) HYBRID MATERIAL VEHICLE PANEL AND METHODS OF MAKING THE SAME (71) Applicant: FLEX-N-GATE ADVANCED PRODUCT DEVELOPMENT, LLC, Warren, MI (US)

(72) Inventors: Geoffrey Brooks, Macomb, MI (US); Steven Perucca, Clinton Township, MI (US); Jack Bekou, Windsor (CA)

(73) Assignee: FLEX-N-GATE ADVANCED PRODUCT DEVELOPMENT, LLC., Warren, MI (US)

( * ) Notice: Subject to any disclaimer, the term of this patent is extended or adjusted under 35 U.S.C. 154(b) by 203 days.

(21) Appl. No.: 17/200,393

(22) Filed: Mar. 12, 2021

(65) Prior Publication Data
US 2021/0284250 A1 Sep. 16, 2021

Related U.S. Application Data (60) Provisional application No. 62/989,457, filed on Mar. 13, 2020.

(51) Int. Cl.
*B62D 29/00* (2006.01)
*B62D 65/16* (2006.01)
*B62D 27/02* (2006.01)
*B62D 25/08* (2006.01)

(52) U.S. Cl.
CPC ........... *B62D 29/004* (2013.01); *B62D 25/08* (2013.01); *B62D 27/02* (2013.01); *B62D 65/16* (2013.01)

(58) Field of Classification Search
CPC ...... B62D 29/004; B62D 25/08; B62D 27/02; B62D 65/16; B62D 29/001; B62D 29/005; B62D 25/16; B62D 25/163; B21D 39/021; B60J 5/0468; B60J 5/0469; B60J 5/0484
See application file for complete search history.

(56) References Cited

U.S. PATENT DOCUMENTS

| 4,115,974 | A | 9/1978 | Purcell |
| 6,586,088 | B1 | 7/2003 | Wilson |
| 10,752,294 | B2* | 8/2020 | Marchlewski ......... B62D 25/16 |
| 2007/0235697 | A1 | 10/2007 | Borade et al. |
| 2016/0200182 | A1 | 7/2016 | Ogawa et al. |
| 2018/0118280 | A1* | 5/2018 | Marchlewski ....... B62D 33/023 |

OTHER PUBLICATIONS

International Search Report on PCT/US2021/022171 dated Jun. 8, 2021; 9 pages.

* cited by examiner

*Primary Examiner* — Lori L Lyjak
(74) *Attorney, Agent, or Firm* — Foley & Lardner LLP (57) ABSTRACT

The present disclosure relates to a hybrid material panel assembly for a vehicle. The panel assembly includes a panel and a plurality of mounting flanges integrally formed with the panel. The panel is formed of a first material having a first coefficient of thermal expansion. The plurality of mounting flanges are formed of a second material having a second coefficient of thermal expansion, where each of the plurality of mounting flanges include a mounting area that defines a mounting surface and at least one mounting hole. The first coefficient of thermal expansion is greater than the second coefficient of thermal expansion.

20 Claims, 6 Drawing Sheets

HYBRID MATERIAL VEHICLE PANEL AND METHODS OF MAKING THE SAME

CROSS-REFERENCE TO RELATED PATENT APPLICATIONS

This application claims the benefit of and priority to U.S. Provisional Application No. 62/989,457, filed on Mar. 13, 2020, the entire disclosure of which is hereby incorporated by reference herein.

BACKGROUND

The present application relates generally to the field of exterior vehicle panels (e.g., front or rear quarter panels, door panels, hoods, bumpers, etc.). More specifically, this application relates to a hybrid panel that may be used to address differential coefficients of thermal expansion that may be present for polymeric-type vehicle panels.

SUMMARY

At least one exemplary embodiment of this application relates to a panel assembly. The panel assembly includes a panel and a plurality of mounting flanges integrally formed with the panel. The panel is formed of a first material having a first coefficient of thermal expansion. The plurality of mounting flanges are formed of a second material having a second coefficient of thermal expansion, each of the plurality of mounting flanges including a mounting area that defines a mounting surface and at least one mounting hole. The first coefficient of thermal expansion is greater than the second coefficient of thermal expansion.

Another exemplary embodiment relates to a front quarter assembly for a vehicle. The front quarter panel assembly includes a panel and a first mount. The panel is formed of a first material having a first coefficient of thermal expansion. The first mount is positioned at a top portion of the panel and is integrally formed with the panel. The first mount is further formed of a second material having a second coefficient of thermal expansion. The first coefficient of thermal expansion is greater than the second coefficient of thermal expansion.

Another exemplary embodiment relates to a method of manufacturing a hybrid material panel assembly. The method includes forming a first mount from a first material having a first coefficient of thermal expansion; preparing the first mount to receive a panel; and forming the panel such that the panel is integrally formed with the first mount, the panel formed from a second material having a second coefficient of thermal expansion. The second coefficient of thermal expansion is greater than the first coefficient of thermal expansion.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Referring generally to the FIGURES, disclosed herein is a hybrid material panel (e.g., paneling, etc.) for vehicles (e.g., motor vehicles, electric vehicles, hybrid vehicles, etc.). The paneling may be for any vehicle type (e.g., sedan, truck, van, etc.). In various exemplary embodiments, the paneling may be any vehicle panel, for example a front quarter panel (i.e., a quarter panel or a fender), a rear quarter panel, a bumper, a tailgate, etc. In one particular exemplary embodiment, the paneling is a front quarter panel. Front quarter panels generally include fenders and are generally used to prevent various debris (e.g., dirt, sand, rocks, etc.) from being thrown into the air by rotating vehicle tires. Front quarter panels may also cover or conceal part of an engine of the vehicle. Additionally, front quarter panels (and, indeed, other vehicle panels) may contribute to the aesthetics of the vehicle.

Vehicle panels (e.g., front quarter panels) may be fabricated from a variety of different materials, including plastics, composite materials (e.g., fiberglass), metals, or metal alloys. Plastic and composite materials may be utilized in certain instances where weight and/or cost may be concerned.

During the painting/coloring process, such panels may be subjected to relatively high temperature processing conditions. For example, a process such as electrophoretic plating, powder coating, etc. may be used to provide the desired color for the panel. These processes, particularly the electrophoretic plating process (i.e., e-coat), may subject the panel to temperatures up to about 500 Kelvin (i.e., about 226.85 degrees Celsius) or more. Most typically, the panels are assembled onto the vehicle structure along with various other external vehicle panels and components (e.g., panels, doors, hoods, etc.) such that each of the external vehicle components advantageously obtain the same properties (e.g., color, finish, etc.) as each other.

Some components of the vehicle, (e.g., chassis, doors, hood, etc.) may be made of a metal or alloy (e.g., steel, aluminum, etc.), which may have a relatively low coefficient of thermal expansion (CTE) (e.g., about or less than $25 \times 10^{-6}$ $K^{-1}$). Other components of the vehicle (e.g., front quarter panel, rear quarter panel, etc.) may be made of a plastic material (e.g., polypropylene, polyurethane, Polyvinyl-Chloride, etc.), and may have a relatively higher CTE (e.g., greater than $25 \times 10^{-6}$ $K^{-1}$). During an elevated temperature process (e.g., greater than about 360 Kelvin (i.e., about 87 degrees Celsius) such as may be experience during the e-coating process, the plastic components may experience greater dimensional changes (e.g., larger change in length) than the metal components. It should be appreciated that area or volumetric coefficients of thermal expansion may be used instead of the linear CTE. In these cases, the area expansion or volumetric expansion of the plastic components is larger than that of the metal components during the elevated temperature process.

Due to the difference in thermal expansion characteristics of the metal components and the plastic components, the thermal expansion of the plastic components may require the plastic components to be loosely mounted to the vehicle (e.g., chassis, frame, etc.) such that the plastic components may be allowed to expand and contract during thermal cycling without permanent deformation. For example, a plastic component (e.g., front quarter panel) may be first mounted loosely to the vehicle body or frame to constrain the front quarter panel in a y-direction (i.e., cross car) but not in an x-direction (fore-aft). The loose mounting of the front quarter panel allows for the plastic material to expand and contract during the thermal cycle of one or more processes in which the front quarter panel is exposed to elevated temperatures (e.g., such as during an e-coating process). Additionally, while the front quarter panel is loosely attached during the e-coating or coloring process, the front quarter panel advantageously obtains the same properties (e.g., color, finish, etc.) as the vehicle body, frame, and other vehicle paneling. The front quarter panel (and other plastic components) may then be finally secured to the vehicle after the thermal cycling processes are completed and the parts cool to normal temperatures.

The efficiency of the manufacturing processes may be impeded by the additional step of having to perform a secondary securing step to finally secure the components to the venicle after the thermal treatment is complete. In particular, manufacturers may struggle with labor balancing to account for multiple panel mounting processes. Therefore, it would be advantageous to provide an improved vehicle panel that overcomes the foregoing challenges. These and other advantageous features will be apparent to those reviewing the present disclosure.

Referring collectively to FIGS. 1-8, a hybrid material panel 100 is shown configured as a front quarter panel assembly. It should be noted that the hybrid material panel may be utilized with other types of vehicle panels as well, and all such panels are considered to be within the scope of the present disclosure. For example, in other embodiments, the hybrid material panel 100 may be a different vehicle panel (e.g., rear quarter panel, tail gate, etc.). The hybrid material design disclosed herein allows for the hybrid material panel 100 to be permanently secured to a vehicle before such panel is subjected to an elevated temperature process such as an e-coating process, without permanent deformation.

Figure 1:
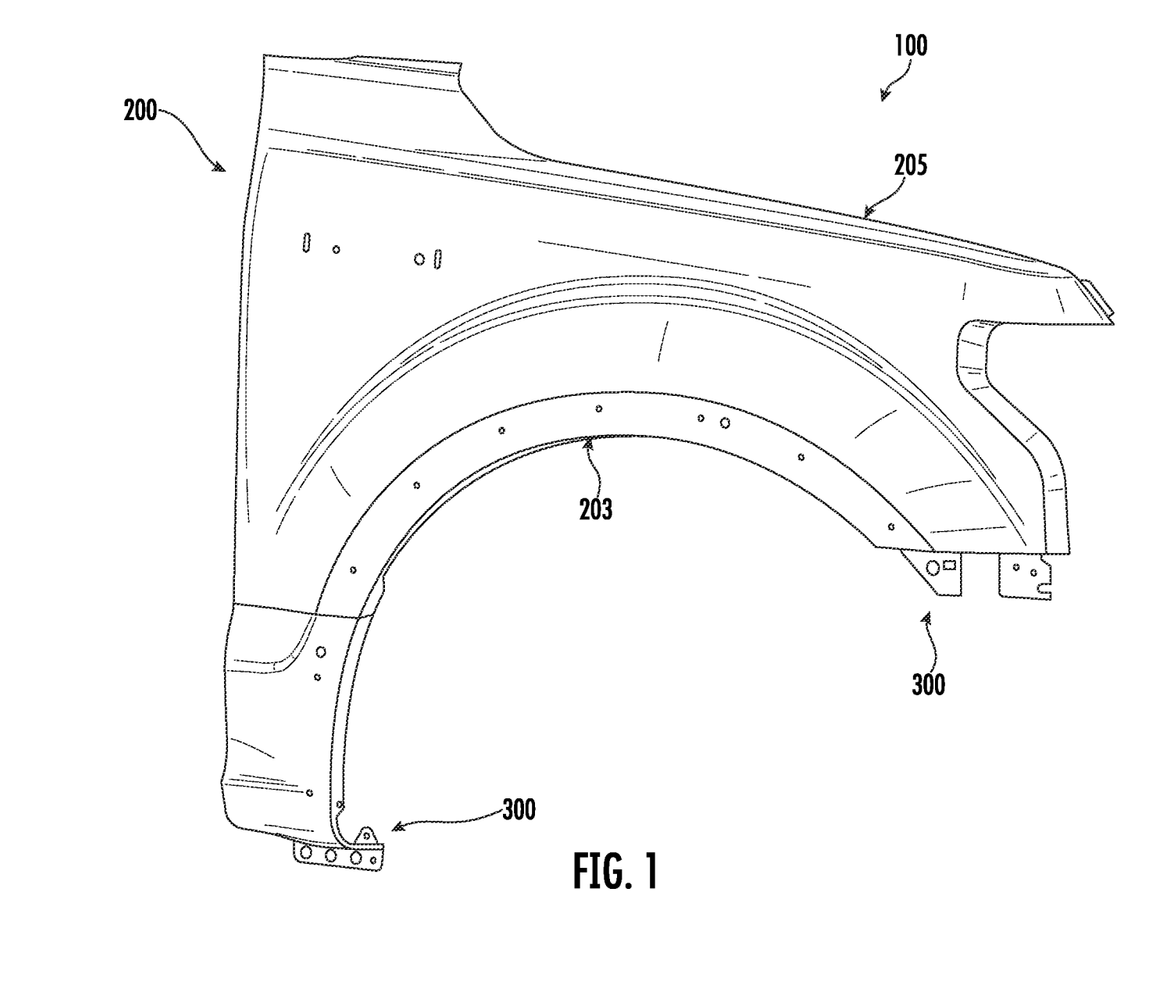
FIG. 1 is a front right perspective view of a hybrid material panel according to an exemplary embodiment.
Figure 2:
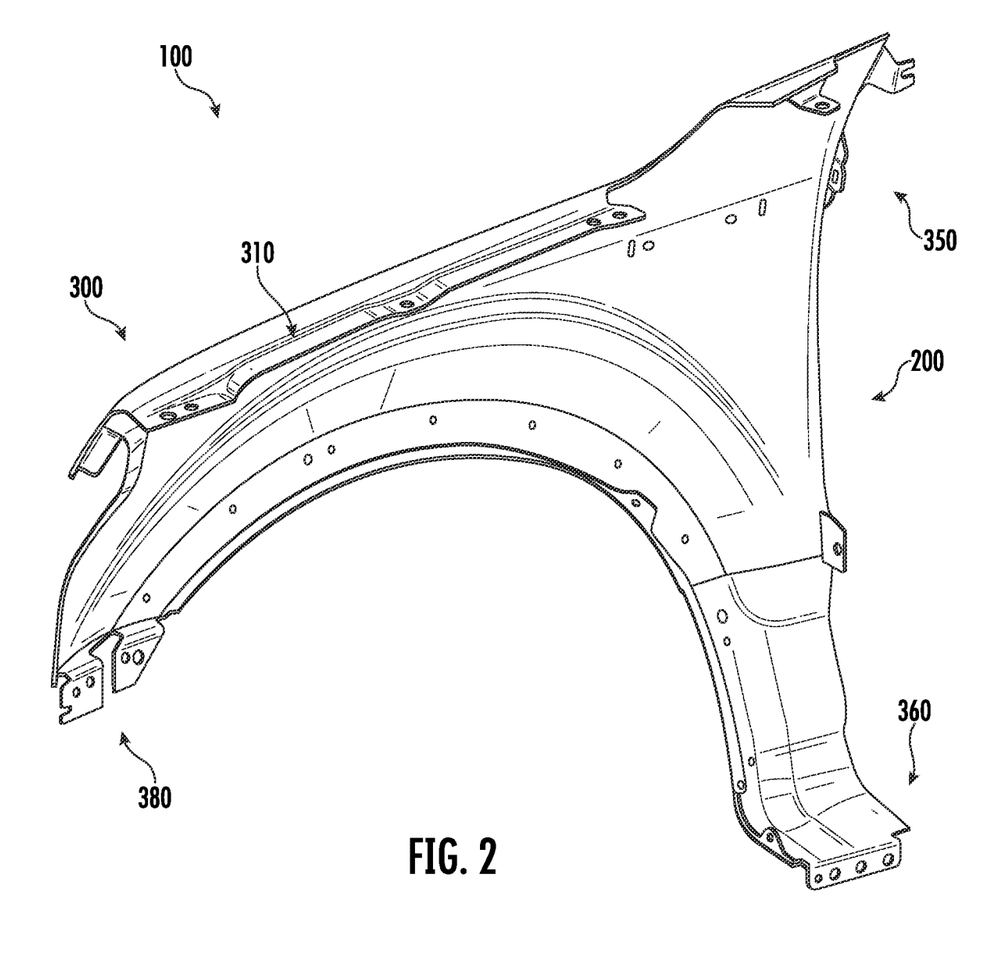
FIG. 2 is a rear left perspective view of the hybrid material panel shown in FIG. 1.

Referring specifically to FIGS. 1-2 a front, right perspective view and a rear, left perspective view of a hybrid material panel 100 are shown in accordance with an exemplary embodiment of the present disclosure. The hybrid material panel 100 is shown as including a panel portion 200 that is made of a first material. The panel portion 200 is shown as including a fender portion 203 with an arc shape configured to accommodate a wheel of the vehicle. The panel portion 200 also includes a upper portion 205 with a flat shape disposed above the fender portion 203 and configured to facilitate the transition from a front of the vehicle (e.g., bumper, hood, headlights, etc.) to a middle portion of the vehicle (e.g., door, A-frame, windshield, etc.). In the embodiment shown, the panel portion 200 has a particular geometry, but, in other embodiments, may have a geometry configured to accommodate the vehicle design.

The hybrid material panel 100 includes a plurality of mounts 300 (e.g., supports, brackets, rails, etc.) extending out of the panel portion 200 as shown in FIGS. 1-2. A first mount 310 of the plurality of mounts 300 is positioned on a top, central portion of the panel portion 200. In some embodiments, the first mount 310 is a catwalk mount configured for coupling proximate to a hood of a vehicle. The first mount 310 may extend lengthwise along an upper portion of the panel portion 200. Additional mounts of the plurality of mounts 300 include upper mounting flanges 350, lower mounting flanges 360, and fore mounting flanges 380 positioned as shown in FIG. 2. The plurality of mounts 300 can include fewer or additional mounts, which may have different positions or geometries such that the plurality of mounts 300 is configured to couple the panel portion 200 to the vehicle. In one embodiment, the plurality of mounts 300 may be formed from a second material. In other embodiments, each of the plurality of mounts may be formed of the first material, the second material, or a third material.

The hybrid material panel 100 is configured to provide a cover for the vehicle near the wheel for aesthetic purposes or functional purposes. For example, the hybrid material panel 100 may be configured to prevent debris displaced by the vehicle wheel from being thrown into the air, or the profile of the hybrid material panel 100 may contribute to the aerodynamics of the vehicle. Additionally, the hybrid material panel 100 may be configured to provide an aesthetic transition from the front of the vehicle to the middle of the vehicle (e.g., from the bumper and headlights, along a bottom portion of the hood, and to the door, A-frame, and windshield). The panel portion 200 is configured to be fixedly coupled to the plurality of mounts 300. The plurality of mounts 300 is configured to couple to the vehicle such that the fender portion 203 covers at least part of the wheel of the vehicle.

In an exemplary embodiment, the first material may be any polymeric or composite material (e.g., plastic material, polypropylene, polyurethane, Polyvinyl-Chloride, fiberglass, carbon fiber, etc.). Additionally, the first material may be chosen such that the coefficient of thermal expansion (i.e., CTE) is greater than the coefficient of thermal expansion of the second material. In a further non-limiting exemplary embodiment, the first material is a polyamide. In some embodiments, the first material is a polyphenylene ether, a polystyrene, or nylon.

In an exemplary embodiment, the second material may be metal (e.g., aluminum, magnesium, steel, etc.) or an alloy (e.g., steel, chromoly, etc.). Additionally, the second material may be formed by a specific process, such as stamping, forging, rolling, casting, and similar processes. In other embodiments, the second material may be a composite material (e.g., carbon reinforced polymers, continuous fiber reinforced thermoplastics, glass weave, etc.) with the substrate being mono-directional, woven, or otherwise incorporated into the base material. Alternatively, the second material may be chosen such that the melting point, recrystallization point, or other thermal transition properties at any working pressure of the second material is sufficiently higher than that of the first material such that the panel portion 200 may be formed around, through, or otherwise adjacent to one or more of the plurality of mounts 300 (e.g., the first mount 310, upper mounting flanges 350, etc.) without changing the properties (e.g., grain structure, etc.) of the second material.

Each of the plurality of mounts 300 is integrally formed with the panel portion 200. As utilized herein, two or more elements are "integrally formed" with each when the two or more elements are formed and joined together as part of a single manufacturing step to create a single-piece or unitary construction that cannot be disassembled without an at least partial destruction of the overall component. In some embodiments, each of the plurality of mounts 300 is overmolded with the panel portion 200. Overmolding is advantageous as it eliminates the need for fasteners or adhesives, both of which may fail overtime due to vibrations, temperature changes, thermal cycling, and weather conditions.

Typically, when plastic components are secured to a vehicle body, a fastener is used with a large washer to distribute the clamping force over a large area of the plastic component. However, under large temperature swings, such as those caused by the electrophoretic plating process, the plastic component may expend. Because the plastic component is already under a clamping load from the fastener and washer, the expansion of the plastic component may increase the clamping load to undesirably high levels, leading to cracking and warping of the plastic component. Overmolding one of the plurality of mounts 300 with the panel portion 200 avoids the initial clamping pressure on the panel portion 200 that would typically be provided by the fastener and washer. Thus, when the panel portion 200 undergoes thermal cycling from the electrophoretic plating process, the panel portion 200 is under less compression forces when compared to more traditional clamping methods.

Figure 3:
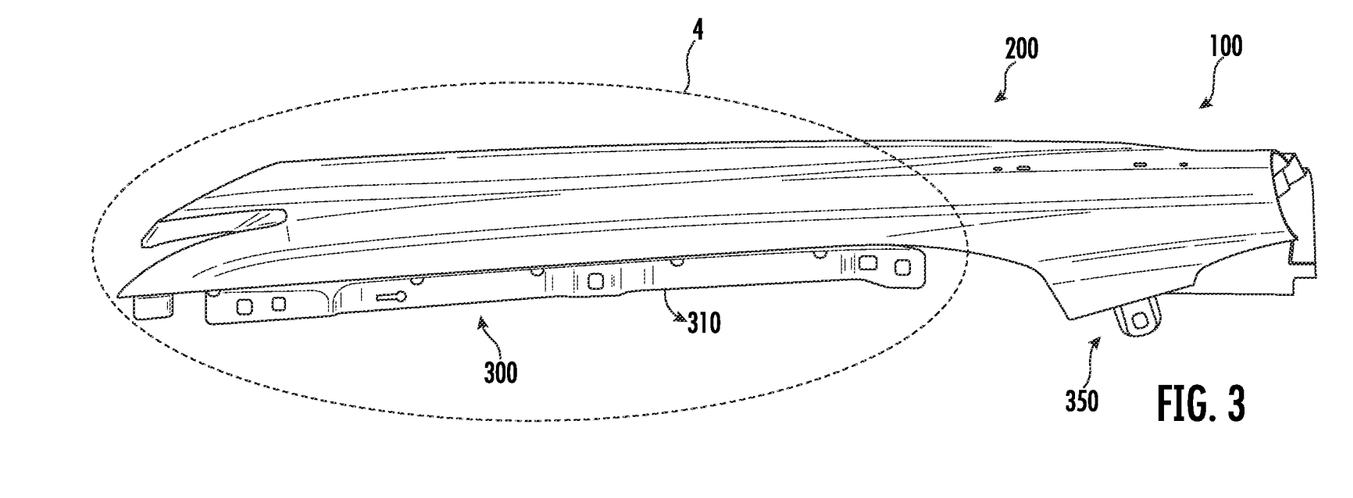
FIG. 3 is a top view of the hybrid material panel shown in FIG. 1.
Figure 4:
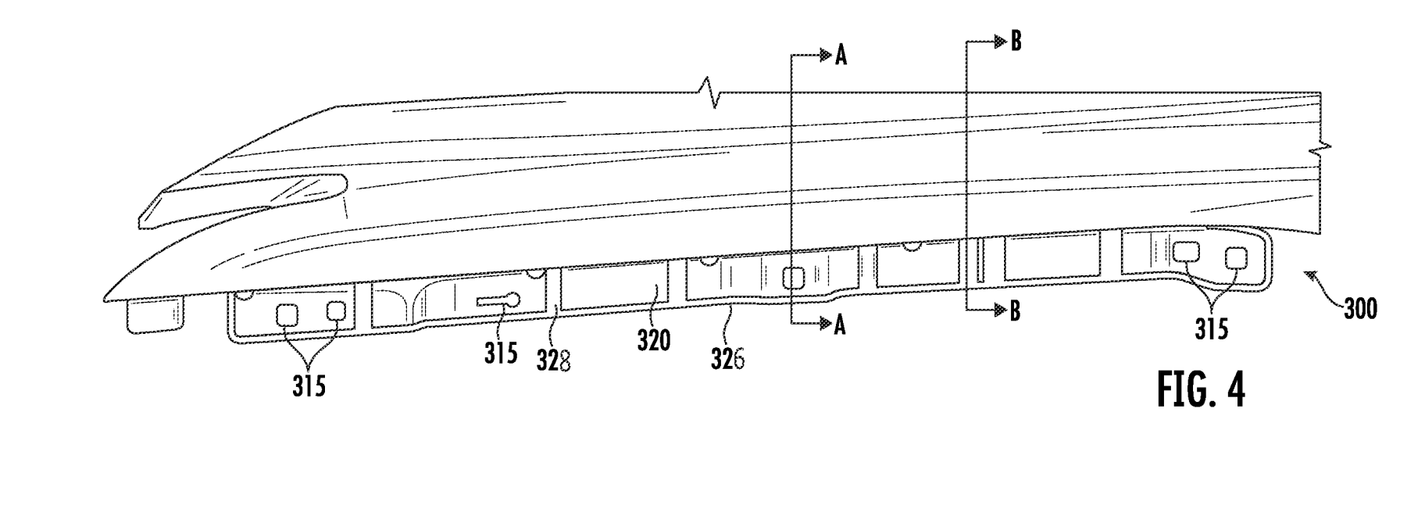
FIG. 4 is a top detailed view of the hybrid material panel shown in FIG. 3.

Referring now to FIGS. 3-4, a top plan view and a detailed plan view of the hybrid material panel 100 in accordance with the embodiment of shown in FIGS. 1-2 are shown. The first mount 310 of the plurality of mounts 300 is an elongated flange made of the second material and is shown as having a mounting area 320 which defines a plurality of mounting holes 315. In the embodiment shown, the mounting holes 315 are shown as having particular geometries and positioning within the mounting area 320. In other embodiments, the first mount 310 may include more or fewer holes with different positioning or geometries thereby changing the mounting area 320. The particular amount, arrangement, and geometry of the mounting holes 315 may be configured to accommodate the vehicle to which hybrid material panel 100 is coupled. The mounting holes 315 are configured to receive a portion of the vehicle (e.g., the chassis, frame, etc.) or a fastener (e.g., a rivet, screw, bolt, nail, hook-and-loop structure, etc.) to couple the panel portion 200 to the vehicle.

The first mount 310 is integrally formed with the panel portion 200. In some embodiments, the first mount 310 is overmolded with the panel portion 200. Extending about a perimeter of the mounting area 320 is a bump guard 326 formed of the same material as the panel portion 200 (e.g., the first material). The bump guard 326 is integrally formed with the panel portion 200 and is contiguous with the panel portion 200. The bump guard 326 may protect the first mount 310 from damage due to rough handling and shipping. The bump guard 326 is overmolded with the first mount 310 when the panel portion 200 is formed. Extending over the mounting area 320 are a plurality of panel strips 328 that are contiguous with the panel portion 200. The panel strips 328 are formed of the first material. The panel strips 328 are overmolded with the first mount 310 and secure the first mount 310 to the panel portion 200.

Referring collectively to FIGS. 5-8, various views of the exemplary embodiment illustrated in FIG. 1 are shown. In particular, the coupling between the panel portion 200 and the first mount 310 is shown. The coupling is a result of the overmolding process; however, the coupling of the panel portion 200 to the first mount 310 may be achieved by the alternative methods described herein.

Figure 5:
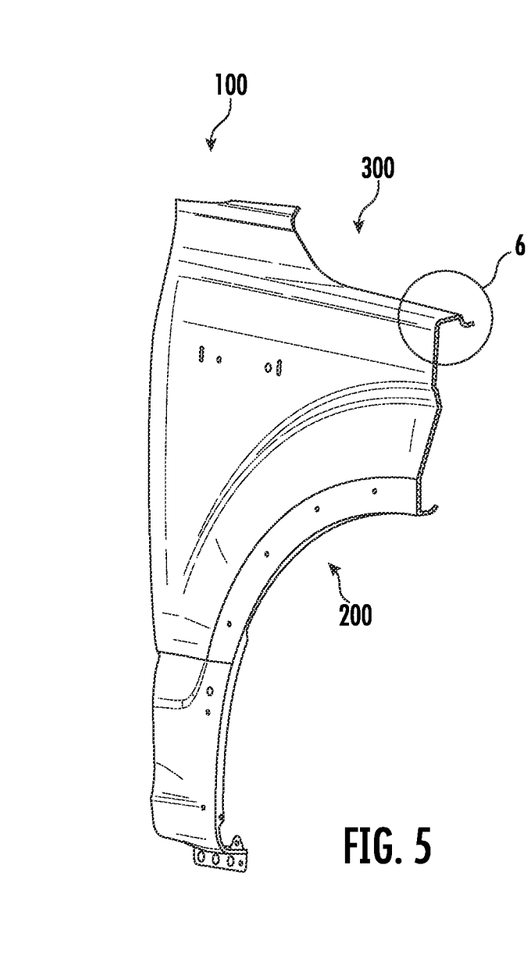
FIG. 5 is a perspective cross-sectional view taken at line A-A in FIG. 4 of the hybrid material panel shown in FIG. 4.
Figure 6:
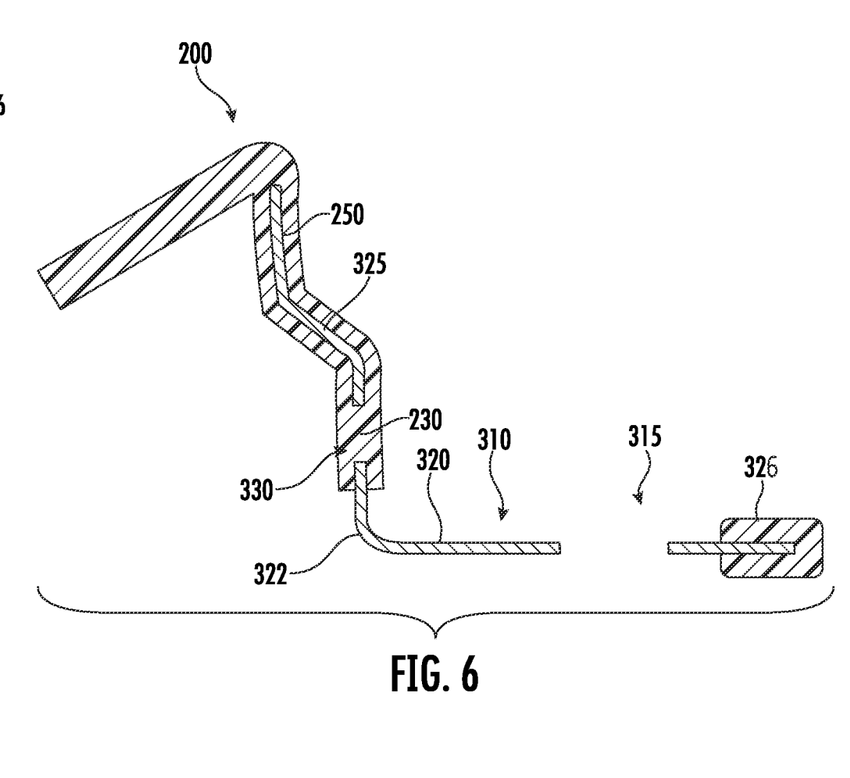
FIG. 6 is a cross-sectional view taken at line A-A in FIG. 4 of the hybrid material panel shown in FIG. 4.

Referring now to FIGS. 5-6, a perspective cross-sectional view and a front, detailed, cross-sectional view through section A-A in FIG. 4 are shown. As shown in FIG. 5, the first mount 310 substantially defines an L-shaped cross-section. The first mount 310 includes a flange 325 (e.g., first mount portion, vertical portion, flange portion) and a mounting area 320 (e.g., second mount portion, horizontal portion, mounting portion) that meet at a corner 322. The flange 325 extends upwards and away from the mounting area 320. Flange 325 has a geometry to suitably match the geometry of the panel portion 200. Flange 325 extends into a cavity 250 of panel portion 200. Flange 325 may have a first plurality of holes 330 at various locations along the x-direction that are configured to receive a portion of the panel portion 200 such that the panel portion 200 and the flange 325 are integrally formed. In other words, the panel portion 200 is overmolded with the flange 325. For example, the panel portion 200 may include a first coupling flange 230 that extends through one of the first plurality of holes 330. The first coupling flange 230 is contiguous with the panel portion 200 and is formed of the first material. As shown in FIG. 6, the first coupling flange 230 is configured to couple the panel portion 200 to the first mount 310. Additionally, the first coupling flange 230 may extend along the x-direction of the panel portion 200 and extend through the first plurality of holes 330. It should be appreciated that the panel portion 200 may include additional coupling flanges configured to couple to one of the plurality of mounts 300 (e.g., one of the upper mounting flanges 350). In some embodiments, the first coupling flange 230 may allow the panel portion 200 to expand without warping and/or cracking. As the panel portion 200, and thus the first coupling flange 230, expand, the first coupling flange 230 may apply a radial force to the surfaces that define the first plurality of holes 330. The first coupling flange 230 is also configured to squeeze outward and away from the first plurality of holes 330 as the first material expands.

Figure 7:
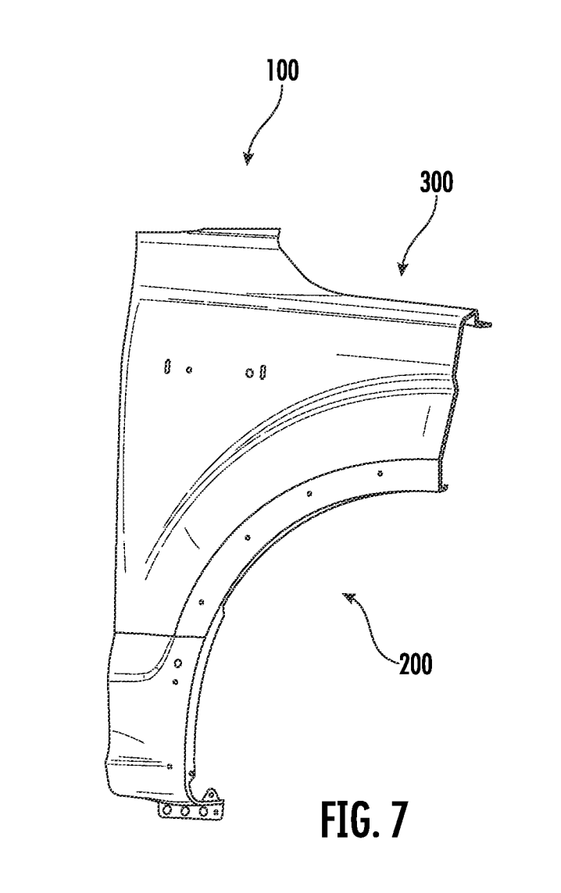
FIG. 7 is a perspective cross-sectional view taken at line B-B in FIG. 4 of the hybrid material panel shown in FIG. 4.
Figure 8:
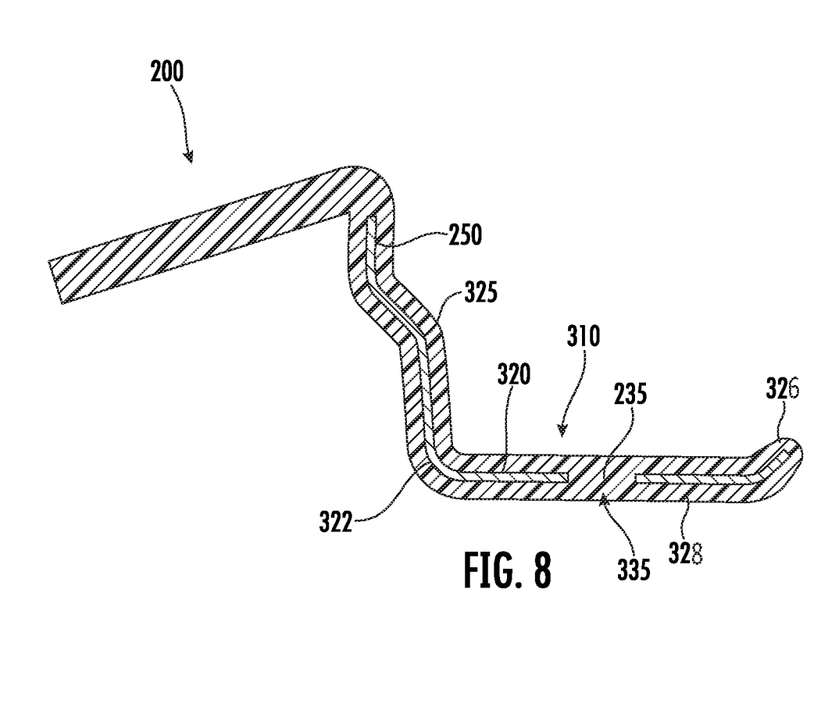
FIG. 8 is a cross-sectional view taken at line B-B in FIG. 4 of the hybrid material panel shown in FIG. 4.

Referring now to FIG. 7-8, a perspective cross-sectional view and a front, detailed cross-sectional view through section B-B in FIG. 5 are shown. The flange 325 is shown extending upwards from mounting area 320 and into the cavity 250 of the panel portion 200. As shown, mounting area 320 includes a second plurality of holes 335 at various locations along the x-direction. In some embodiments, the second plurality of holes 335 may be differently positioned about mounting area 320. The second plurality of holes 335 are configured to receive a portion of the panel portion 200 such that the panel portion 200 and the mounting area 320 are integrally formed. In some embodiments, the mounting area 320 is overmolded with the panel portion 200. Specifically, the panel portion 200 includes a second coupling flange 235 that is contiguous with one of the plurality of panel strips 328 and that extends through one of the second plurality of holes 335. The second coupling flange 235, the panel strip 328, and the bump guard 326 are integrally formed with the panel portion 200 such that a single body is formed. All of the second coupling flange 235, the panel strip 328, and the bump guard 326 cooperate to secure (e.g., overmold) the first mount 310 with the panel portion 200. The second coupling flange 235 may extend along the x-direction of the panel portion 200 and extend through one or more of the second plurality of holes 335. Additionally, in some embodiments, the panel portion 200 may include additional coupling flanges configured to extend through one or more of the second plurality of holes 335. It should be appreciated that the panel portion 200 may include additional coupling flanges configured to couple to one of the plurality of mounts 300 (e.g., one of the upper mounting flanges 350).

Figure 9:
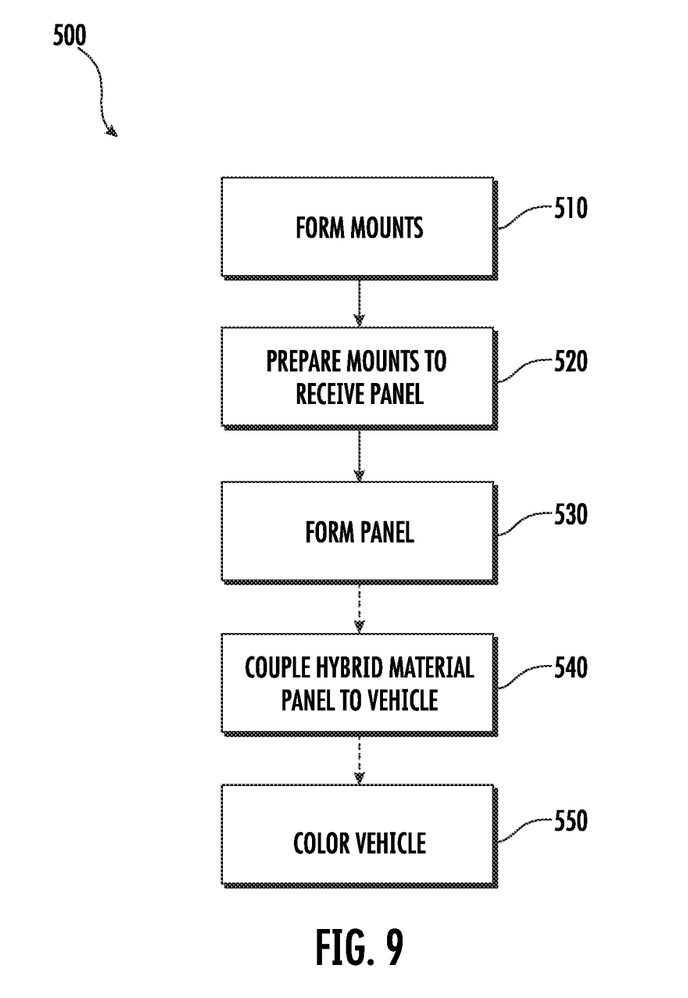
FIG. 9 is block diagram of a method of manufacturing a hybrid material panel according to an exemplary embodiment.

Now referring to FIG. 9, a block diagram of a method of manufacturing a hybrid material panel 500 (e.g., the hybrid material panel 100 of FIG. 1) with optional vehicle mounting and coloring steps is shown according to an exemplary embodiment. Notably, the steps can be altered or rearranged depending on methods of other embodiments.

At step 510, one or more mounts (e.g., the plurality of mounts 300 of FIGS. 1-2) are formed. In some embodiments, such as when the panel is formed of the first material, the one or more mounts are formed of the second material. In some embodiments, one of the one or more mounts is formed of the first material. Alternatively, one of the one or more mounts may be formed using a third material. The third material may be a metal or plastic material different from both the first material and the second material. For example, the panel portion 200 may be formed of plastic, the first mount 310 may be formed of aluminum, and one of the fore mounting flanges 380 may be formed of a composite (e.g., carbon fiber reinforced resin). In some embodiments, each of the one or more mounts may be selectively formed of the first material, the second material, or the third material. For example, a first mount (e.g., the first mount 310 of FIGS. 3-4) may be formed of the second material and additional mounts (e.g., upper mounting flanges 350) may be formed of the first material. In some embodiments, all of the mounts may be formed of the second material. According to an exemplary embodiment, the mounts may be formed to a desired geometry (e.g., a geometry configured to accommodate the vehicle design) according to a suitable process for the chosen material. For example, mounts formed from the first material may be formed by various processes, such as by injection molding, extrusion, vacuum casting, and the like. In some embodiments, mounts formed from the second material are formed by an appropriate process such as extrusion, stamping, cutting, and the like. In some embodiments, such as when the second material is a composite or resin-reinforced fabric matrix, the mounts may be formed by open molding, closed molding, cast polymer molding, or vacuum bagging.

At step 520, the one or more mounts are prepared to receive (e.g., couple to) a panel (e.g., panel portion 200) of the hybrid material panel. In some embodiments, the mounts are formed at step 510 in a mold configured to form both the mounts and the panel. In other embodiments, the mounts may be formed at step 510 in a mold that is different from the mold used to form the panel or by a different process. In these embodiments, after the mounts are formed, the mounts may be placed into a mold configured to form the panel around the mounts. Alternately, the mounts may be configured to receive a fastener (e.g., bolt, screw, rivet, etc.) to couple to the panel.

At step 530, the panel (e.g., panel portion 200) is formed. The panel may be formed by various processes appropriate for the first material, as described above. In some embodiments, the panel is formed by injection molding a plastic into a mold and integrally forming the panel with the mounts. For example, the mounts may be secured to the mold such that the flange 325 extends into the mold cavity. As the first material is injected into the mold, the first material flows through the first plurality of holes 330 and around the flange 325, integrally forming the first mount 310 with the panel portion 200 to form the hybrid material panel 100. In some embodiments, the mounting are a 310 is positioned within the mold cavity such that the first material may flow around the mounting are 310 to form the panel strip 328. The first material may also flow through the second plurality of holes 335, thus forming the second coupling flange 235. In other words, the panel is formed by an overmolding process in which a mold containing the mounts is configured to receive the first material and form the first material into the desired geometry. The mold may be further configured to align the mounts relative to the panel such that the mounts are positioned as desired. Additionally, during the overmolding process, the first material may be formed around (e.g., around flange 325 of FIGS. 6 and 8) or through (e.g., through the first plurality of holes 330 or the second plurality of holes 335 of FIG. 6 and FIG. 8, respectively) portions of the mounts. As described above, the panel is coupled to the mounts by the physical interconnection between the panel and the plurality of holes extending through the mounts (e.g., the first coupling flange 230 extending through the first plurality of holes 330 in FIG. 6). The overmolding process results in the hybrid material panel (e.g., the hybrid material panel 100 of FIG. 1) that is attachable to a vehicle. Alternately, in some embodiments, the panel is formed separately from the mounts. In these embodiments, the panel coupled with the mounts, such as by using fasteners or adhesives.

Still referring to FIG. 9, step 540 and step 550 are exemplary post-manufacturing steps (i.e., they take place after the hybrid material panel is formed). These steps may be optional as indicated by dashed arrow lines connecting the boxes in FIG. 9.

At step 540, the hybrid material panel is coupled to a vehicle. For example, the hybrid material panel may be coupled to the vehicle such that the hybrid material panel is fully constrained relative to the vehicle (e.g., has no degrees of freedom).

At step 550, the vehicle, including the hybrid material panel, other panels, doors, other exterior components, etc. are colored and/or coated in a process (e.g., e-coating, powder coat, etc.) as described herein or otherwise. During the coloring/coating process the entire vehicle may experience at least one thermal cycle, such as described herein. During the thermal cycle, the panel made of the first material may expand or contract without permeant deformation based on the CTE of the first material. The mounts made of the second material may expand or contract to a lesser degree based on the CTE of the second material.

The hybrid material panel for a vehicle described herein is advantageously configured such that the hybrid material panel may be coupled to the vehicle before an elevated thermal process (e.g., e-coating). During the elevated thermal process, the plastic paneling may deform more rapidly, or by a greater magnitude than the metal (or composite) materials that make up the vehicle and the mounts (e.g., flanges, brackets, etc.). For example, an outer surface of the plastic panel may expand outwards (e.g., away from the vehicle) allowing the plastic panel to "pillow" out at elevated temperatures. When the panel cools back to ambient, the outer surface will return to a nominal position.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

The construction and arrangement of the elements of the hybrid material vehicle paneling as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Additionally, the word "exemplary" is used to mean serving as an example, instance, or illustration. Any embodiment or design described herein as "exemplary" is not necessarily to be construed as preferred or advantageous over other embodiments or designs (and such term is not intended to connote that such embodiments are necessarily extraordinary or superlative examples). Rather, use of the word "exemplary" is intended to present concepts in a concrete manner. Accordingly, all such modifications are intended to be included within the scope of the present disclosure. Other substitutions, modifications, changes, and omissions may be made in the design, operating conditions, and arrangement of the preferred and other exemplary embodiments without departing from the scope of the appended claims.

Other substitutions, modifications, changes and omissions may also be made in the design, operating conditions and arrangement of the various exemplary embodiments without departing from the scope of the present invention. For example, any element (e.g., paneling, mounts, holes, flanges, and other structures thereof, etc.) disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and not only structural equivalents but also equivalent structures. Other substitutions, modifications, changes and omissions may be made in the design, operating configuration, and arrangement of the preferred and other exemplary embodiments without departing from the scope of the appended claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A panel assembly comprising:
   a panel formed of a first material having a first coefficient of thermal expansion; and
   a plurality of mounting flanges integrally formed with the panel, the plurality of mounting flanges formed of a second material having a second coefficient of thermal expansion that is lower than the first coefficient of thermal expansion, and each of the plurality of mounting flanges including a mounting area that defines a mounting surface and at least one mounting hole.

2. The panel assembly of claim 1, wherein the plurality of mounting flanges includes a first mount having a flange integrally formed with the panel.

3. The panel assembly of claim 2, wherein the flange includes a first aperture that receives a first coupling flange of the panel.

4. The panel assembly of claim 3, wherein the mounting area comprises a second aperture that receives a second coupling flange of the panel.

5. The panel assembly of claim 3, wherein the panel further comprises a cavity, the flange of the first mount extending into the cavity.

6. The panel assembly of claim 2, further comprising:
a bump guard integrally formed with the first mount about a perimeter of the mounting area, the bump guard being contiguous with the panel; and
a panel strip extending over the mounting surface and contiguous with the bump guard and the panel.

7. The panel assembly of claim 1, wherein the first material is a polymeric material and the second material is a metal or metal alloy.

8. The panel assembly of claim 1, wherein the panel further comprises:
a fender portion having an arc shape configured to accommodate a wheel of a vehicle; and
an upper portion disposed above the fender portion and coupled with at least one of the plurality of mounting flanges.

9. The panel assembly of claim 8, wherein the plurality of mounting flanges includes an upper mounting flange, a lower mounting flange, and a fore mounting flange.

10. A front quarter panel assembly for a vehicle, the front quarter panel assembly comprising:
a panel formed of a first material having a first coefficient of thermal expansion;
a first mount positioned at a top portion of the panel and integrally formed with the panel, the first mount formed of a second material having a second coefficient of thermal expansion;
wherein the first coefficient of thermal expansion is greater than the second coefficient of thermal expansion.

11. The front quarter panel assembly of claim 10, wherein the first mount comprises a flange and a mounting area, the flange received by a cavity of the panel.

12. The front quarter panel assembly of claim 11, wherein the panel further includes a first coupling flange extending through a first aperture of the flange.

13. The front quarter panel assembly of claim 12, wherein the panel further includes a second coupling flange extending through a second aperture of the mounting area.

14. The front quarter panel assembly of claim 11, further comprising a bump guard extending about a perimeter of the mounting area, the bump guard contiguous with the panel and integrally formed with the first mount.

15. The front quarter panel assembly of claim 10, wherein:
the first material is a polymeric material;
the second material is one of a metal or metal alloy; and
the panel is overmolded with the first mount.

16. The front quarter panel assembly of claim 10, further comprising a second mount formed of a third material different from the first material and different from the second material, the second mount overmolded with the panel.

17. A method of forming a panel assembly, the method comprising:
forming a first mount from a first material having a first coefficient of thermal expansion;
preparing the first mount to receive a panel; and
forming the panel such that the panel is integrally formed with the first mount, the panel formed from a second material having a second coefficient of thermal expansion;
wherein the second coefficient of thermal expansion is greater than the first coefficient of thermal expansion.

18. The method of claim 17, wherein the first mount comprises:
a flange defining a first aperture; and
a mounting area defining a second aperture;
wherein the step of forming the panel further comprises integrally forming the panel with the first mount by extending a portion of the panel through both the first aperture and the second aperture.

19. The method of claim 17, further comprising:
forming a second mount from a third material different from both the first material and the second material, the third material having a third coefficient of thermal expansion less than the first coefficient of thermal expansion; and
coupling the second mount with the panel via overmolding.

20. The method of claim 17, wherein:
the first material is a metal or metal alloy;
the second material is a polymeric material; and
the step of forming the panel further includes injection molding the panel such that the first mount is overmolded with the panel.

* * * * *